United States Patent
Lin

(10) Patent No.: US 11,435,625 B2
(45) Date of Patent: Sep. 6, 2022

(54) DISPLAY PANEL AND DISPLAY DEVICE

(71) Applicant: HKC CORPORATION LIMITED, Shenzhen (CN)

(72) Inventor: Jia-Ren Lin, Chongqing (CN)

(73) Assignee: HKC CORPORATION LIMITED, Shenzhen (CN)

( * ) Notice: Subject to any disclaimer, the term of this patent is extended or adjusted under 35 U.S.C. 154(b) by 836 days.

(21) Appl. No.: 16/319,472

(22) PCT Filed: Nov. 21, 2018

(86) PCT No.: PCT/CN2018/116612
§ 371 (c)(1),
(2) Date: Jan. 21, 2019

(87) PCT Pub. No.: WO2020/093454
PCT Pub. Date: May 14, 2020

(65) Prior Publication Data
US 2021/0356793 A1    Nov. 18, 2021

(30) Foreign Application Priority Data

Nov. 6, 2018  (CN) .......................... 201821821350.4

(51) Int. Cl.
G02F 1/1339    (2006.01)
G02F 1/1335    (2006.01)
G02F 1/1343    (2006.01)

(52) U.S. Cl.
CPC .... *G02F 1/13398* (2021.01); *G02F 1/133512* (2013.01); *G02F 1/134309* (2013.01); *G02F 2202/16* (2013.01)

(58) Field of Classification Search
CPC ............... G02F 1/13398; G02F 1/1339; G02F 1/13392; G02F 1/133512; G02F 1/136209
See application file for complete search history.

(56) References Cited

U.S. PATENT DOCUMENTS

| 6,392,735 B1* | 5/2002 | Tani ...................... G02F 1/1339 |
| | | 349/156 |
| 2008/0003380 A1 | 1/2008 | Kim et al. |
| 2018/0292689 A1* | 10/2018 | Joo ................... G02F 1/136286 |

FOREIGN PATENT DOCUMENTS

| CN | 101424839 A | 5/2009 |
| CN | 103698947 A | 4/2014 |
| CN | 103885221 A | 6/2014 |
| CN | 105158986 A | 12/2015 |

OTHER PUBLICATIONS

English language translation of Chinese Patent publication No. CN107450237 published Dec. 8, 2017. Translation downloaded from Espacenet at http://https://worldwide.espacenet.com on Nov. 16, 2021; translation into English provided by Google Translate tool onsite. (Year: 2017).*

(Continued)

*Primary Examiner* — Angela K Davison

(57) ABSTRACT

This application discloses a display panel and a display device. The display panel includes an Au ball fixing area and a boundary area, where the boundary area is provided on one side of the Au ball fixing area adjacent to a display area; and a surface of the Au ball fixing area is lower than a surface of the boundary area.

20 Claims, 5 Drawing Sheets

(56) References Cited

OTHER PUBLICATIONS

International Search Report issued in corresponding international application No. PCT/CN2018/116612, dated Jul. 29, 2019(8 pages).
Written Opinion of the International Searching Authority for No. PCT/CN2018/116612.

* cited by examiner

DISPLAY PANEL AND DISPLAY DEVICE

This application claims priority to Chinese Patent Application No. CN201821821350.4, filed with the Chinese Patent Office on Nov. 6, 2018 and entitled "DISPLAY PANEL AND DISPLAY DEVICE", which is incorporated by reference in its entirety.

TECHNICAL FIELD

This application relates to the field of display technologies, and in particular, to a display panel and a display device.

BACKGROUND

It should be understood that descriptions herein merely provide background information related to this application, and do not necessarily constitute the prior art.

With the development and advancement of science and technologies, owing to hot spots such as thin body, power saving, and low radiation, displays become mainstream products of displays and are widely applied. A flat-panel display includes a thin film transistor-liquid crystal display (TFT-LCD), an organic light-emitting diode (OLED) display, and the like. The TFT-LCD controls rotating directions of liquid crystal molecules, to refract light in a backlight module to generate a picture, and the TFT-LCD has many advantages such as thin body, power saving, and no radiation. The OLED display is manufactured by using an organic electroluminescent diode, and has many advantages such as self-luminous, high definition and contrast rate, short response time, flexible display, and large-area full-color display.

For displays, a high penetration rate and a nan-ow bezel aesthetic design are pursued. Consequently, many problems are caused to display screens. At positions of Au ball particles, uneven picture quality display caused by a phenomenon of light leakage is particularly prone to occur, and the unevenness of picture display reduces a shipment level of a panel in quality.

SUMMARY

An objective of this application is to provide a display panel and a display device, to resolve a technical problem of display unevenness.

To achieve the foregoing objective, this application provides a display panel. The display panel comprises a first substrate and a second substrate; the second substrate is arranged opposite to the first substrate; a non-display area of the first substrate comprises a black photoresist layer, a common electrode layer, and Au balls; the common electrode layer is arranged on the black photoresist layer; the Au ball is arranged on the common electrode layer, and configured to connect the first substrate and the second substrate; the common electrode layer comprises an Au ball fixing area at a position corresponding to the Au ball; a boundary area is provided on one side of the Au ball fixing area adjacent to a display area; and a surface of the Au ball fixing area is lower than a surface of the boundary area.

Optionally, the black photoresist layer is provided with at least one groove correspondingly formed in the Au ball fixing area; and a surface of the common electrode layer covering the bottom of the groove is a first surface, and a surface of the common electrode layer covering the boundary area is a second surface, the first surface being lower than the second surface.

Optionally, there is one groove, and the groove is a through groove extending along a frame of the non-display area; and there is a plurality of Au balls, and all of the Au balls are arranged in the groove.

Optionally, there is a plurality of grooves extending along a frame of the non-display area; and there is a plurality of Au balls, and each of the Au balls is correspondingly fixed in one of the grooves.

Optionally, the bottom of the groove is a concave curved surface.

Optionally, there are four grooves, and lengths of the four grooves are equal to lengths of four Au ball fixing areas.

Optionally, a ratio of a height of the surface of the Au ball fixing area to a height of the surface of the boundary area ranges from 30% to 70%.

Optionally, the black photoresist layer comprises a retaining wall correspondingly formed in the boundary area, and a material of the retaining wall is the same as a material of the black photoresist layer, the surface of the Au ball fixing area being lower than a surface of the retaining wall in the boundary area.

Optionally, there are four retaining walls, and the four retaining walls are connected end to end.

This application further discloses a display panel. The display panel comprises a first substrate and a second substrate. The second substrate is arranged opposite to the first substrate. A non-display area of the first substrate comprises a black photoresist layer, a common electrode layer, Au balls, and at least one groove. The common electrode layer is arranged on the black photoresist layer. The common electrode layer comprises an Au ball fixing area at a position corresponding to the Au ball. A boundary area is provided on one side of the Au ball fixing area adjacent to a display area. The black photoresist layer is provided with the groove correspondingly formed in the Au ball fixing area. A surface of the common electrode layer covering the Au ball fixing area is lower than a surface of the common electrode layer in the boundary area, and a length of the groove is equal to a length of the entire Au ball fixing area. The groove is provided with a plurality of Au balls.

This application further discloses a display device. The display device comprises the display panel, wherein the display panel comprises:
a first substrate; and
a second substrate, arranged opposite to the first substrate, wherein
a non-display area of the first substrate comprises:
a black photoresist layer;
a common electrode layer, arranged on the black photoresist layer; and
Au balls, arranged on the common electrode layer, and configured to connect the first substrate and the second substrate, wherein
the common electrode layer comprises an Au ball fixing area at a position corresponding to the Au ball, and a boundary area is provided on one side of the Au ball fixing area adjacent to a display area; and
a surface of the Au ball fixing area is lower than a surface of the boundary area.

Optionally, the black photoresist layer is provided with at least one groove correspondingly formed in the Au ball fixing area; and a surface of the common electrode layer covering the bottom of the groove is lower than a surface of the common electrode layer covering the boundary area.

Optionally, there is one groove, and the groove is a through groove extending along a frame of the non-display area; and there is a plurality of Au balls, and all of the Au balls are arranged in the groove.

Optionally, there is a plurality of grooves extending along a frame of the non-display area; and there is a plurality of Au balls, and each of the Au balls is correspondingly fixed in one of the grooves.

For display screens, a high penetration rate and a narrow bezel aesthetic design are pursued. Consequently, many problems are caused to display screens. For example, at positions of Au balls, a phenomenon of uneven light leakage is particularly prone to occur, especially in a narrow bezel. Provided that particle sizes of the Au balls remain unchanged, when upper and lower substrates are pressed against each other, there may be an Au ball overflowing into a display area due to a relatively close distance between the Au ball and the display area. A substrate area corresponding to an Au ball fixing area is made thin, two sides of the black photoresist layer that correspond to the Au ball fixing area are higher than the area corresponding to the Au ball, and the Au balls are centered to the area that is made thin, limiting a range of displacement of the Au ball, blocking overflowing of the Au ball into the display area, and finally preventing display unevenness caused by light leakage, thereby improving panel quality.

BRIEF DESCRIPTION OF DRAWINGS

The accompanying drawings included are used to provide a further understanding of the embodiments of this application, constitute a part of the specification, illustrate examples of implementations of this application, and explain the principle of this application together with the text description. Apparently, the accompanying drawings in the following description show merely some embodiments of this application, and a person of ordinary skill in the art may still derive other drawings from these accompanying drawings without creative efforts. In the figures.

DETAILED DESCRIPTION

Figure 1:
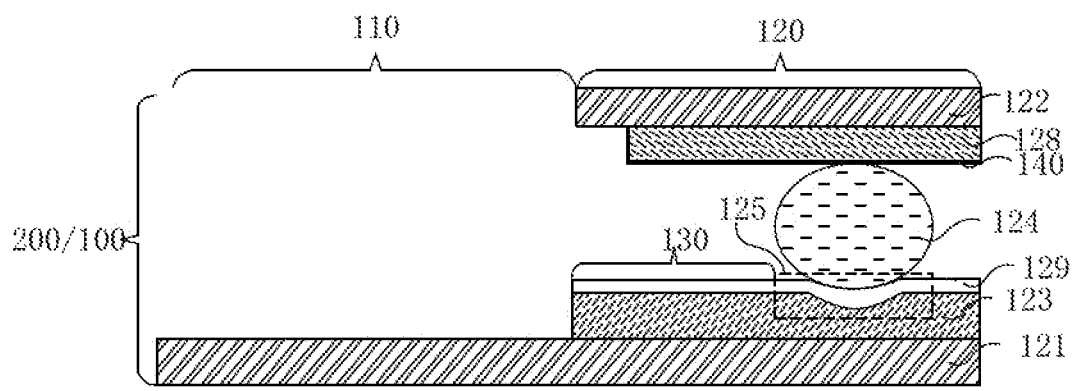
FIG. 1 is a sectional view of a display panel according to an embodiment of this application.

Specific structures and functional details disclosed herein are merely representative, and are intended to describe the objectives of the exemplary embodiments of this application. However, this application may be specifically implemented in many alternative forms, and should not be construed as being limited to the embodiments set forth herein.

In the description of this application, it should be understood that orientation or position relationships indicated by the terms such as "center", "transverse", "on", "below", "left" "right", "vertical", "horizontal", "top", "bottom", "inside", and "outside" are based on orientation or position relationships shown in the accompanying drawings, and are used only for ease and brevity of illustration and description, rather than indicating or implying that the mentioned apparatus or element must have a particular orientation or must be constructed and operated in a particular orientation. Therefore, such terms should not be construed as limiting of this application. In addition, the terms such as "first" and "second" are used only for the purpose of description, and should not be understood as indicating or implying the relative importance or implicitly specifying the number of the indicated technical features. Therefore, a feature defined by "first" or "second" can explicitly or implicitly include one or more of said features. In the description of this application, unless otherwise stated, "a plurality of" means two or more than two. In addition, the terms "include", "comprise" and any variant thereof are intended to cover non-exclusive inclusion.

In the description of this application, it should be noted that unless otherwise explicitly specified or defined, the terms such as "mount", "install", "connect", and "connection" should be understood in a broad sense. For example, the connection may be a fixed connection, a detachable connection, or an integral connection; or the connection may be a mechanical connection or an electrical connection; or the connection may be a direct connection, an indirect connection through an intermediary, or internal communication between two elements. A person of ordinary skill in the art may understand the specific meanings of the foregoing terms in this application according to specific situations.

The terminology used herein is for the purpose of describing specific embodiments only and is not intended to be limiting of exemplary embodiments. As used herein, the singular forms "a", "an" and "the" are intended to include the plural forms as well, unless the context clearly indicates otherwise. It should be further understood that the terms "include" and/or "comprise" when used in this specification, specify the presence of stated features, integers, steps, operations, elements, and/or components, but do not preclude the presence or addition of one or more other features, integers, steps, operations, elements, components, and/or combinations thereof.

The applicant uses an undisclosed technical solution, to avoid a light leakage problem by reducing particle sizes of Au balls, and a relatively precise Au ball dispensing device is required to be used for cooperation, but stability in a production process is sacrificed.

This application is further described below with reference to the accompanying drawings and embodiments.

As shown in FIG. 1, an embodiment of this application discloses a display panel 100. The display panel 100 includes a first substrate 121 and a second substrate 122. The second substrate 122 is arranged opposite to the first substrate 121. A non-display area 120 of the first substrate 121 includes: a black photoresist layer 123; a common electrode layer, arranged on the black photoresist layer 123; and Au balls 124, arranged on the common electrode layer 129 and configured to connect the first substrate 121 and the second substrate 122. The common electrode layer 129 includes an Au ball fixing area 125 at a position corresponding to the Au ball 124. A boundary area 130 is provided on one side of the Au ball fixing area 125 adjacent to a display area 110, and a surface of the Au ball fixing area 125 is lower than a surface of the boundary area 130.

In this solution, for display screens, a high penetration rate and a narrow bezel aesthetic design are pursued. Consequently, many problems are caused to display screens. For example, at positions of the Au balls 124, a phenomenon of uneven light leakage is particularly prone to occur, and a shipment level of a panel in quality is reduced due to the unevenness, especially in a narrow bezel. There may be an Au ball 124 overflowing into the display area 110 due to a relatively close distance between the Au ball 124 and the display area 110. A substrate area corresponding to the Au ball fixing area 125 is made thin, two sides of the black photoresist layer 123 that correspond to the Au ball fixing area 125 are higher than the area 125 corresponding to the Au ball, so that the Au balls 124 are centered to the area that is made thin, limiting a range of displacement of the Au balls 124, blocking overflowing of the Au ball 124 into the display area, and finally preventing light leakage, thereby improving panel quality.

Figure 2:
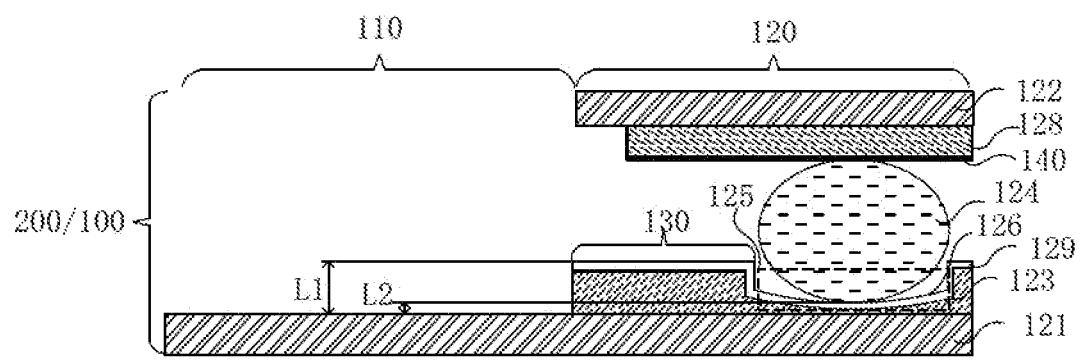
FIG. 2 is a sectional view of a groove according to an embodiment of this application.

As shown in FIG. 2, in an embodiment, a black photoresist layer 123 is provided with at least one groove 126, a surface of a common electrode layer 129 correspondingly covering the bottom of the groove 126 is a first surface, and a surface of the common electrode layer 129 correspondingly covering a boundary area 130 is a second surface, the first surface being lower than the second surface.

In this solution, the surface of the common electrode layer 129 covering the bottom of the groove 126 and correspondingly formed in the Au ball fixing area 125 is the first surface that is lower than the second surface of the common electrode layer 129 covering the boundary area 130. L1 is a height of the surface of the common electrode layer 129 covering the boundary area 130, and L2 is a height of the surface of the common electrode layer 129 covering the bottom of the groove. The height L2 of the surface of the common electrode layer 129 covering the bottom of the groove 126 is lower than the height L1 of the surface of the common electrode layer 129 covering the boundary area 130. The groove 126 has a height and can block overflowing of an Au ball 124, and a height difference provides a blocking function and is manufactured together with the black photoresist layer 123 by simply adjusting a mask. Compared with an example where a distance to a display area 110 is increased and particle sizes of Au balls 124 are reduced, which requires purchase of a high-precision device for dispensing Au balls 124, this solution features simpler manufacturing and lower costs.

Figure 3:
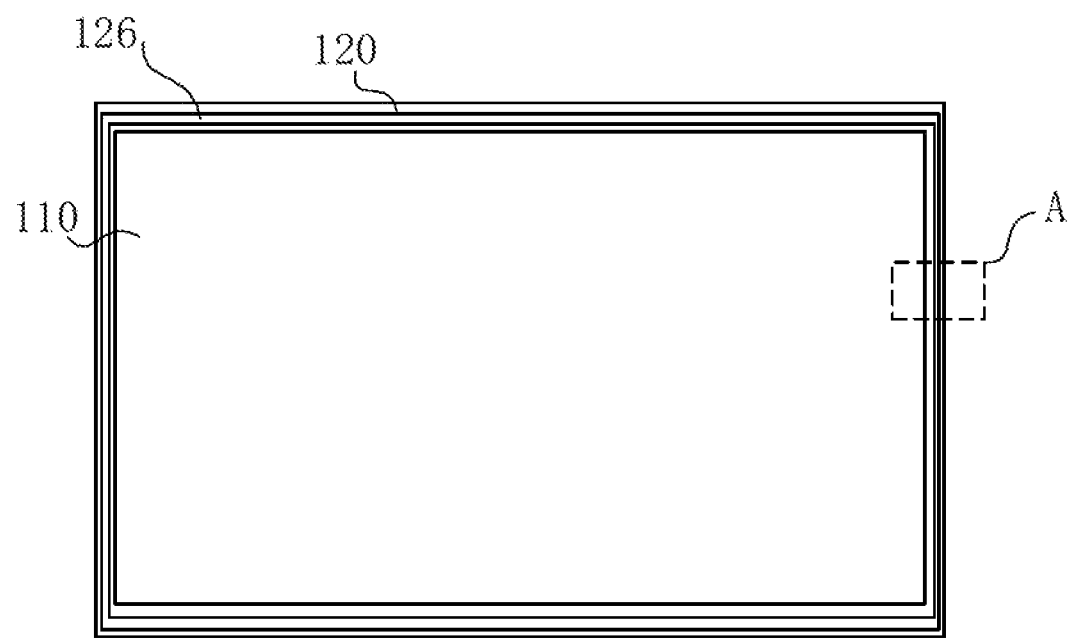
FIG. 3 is a top view of a groove according to an embodiment of this application.
Figure 4:
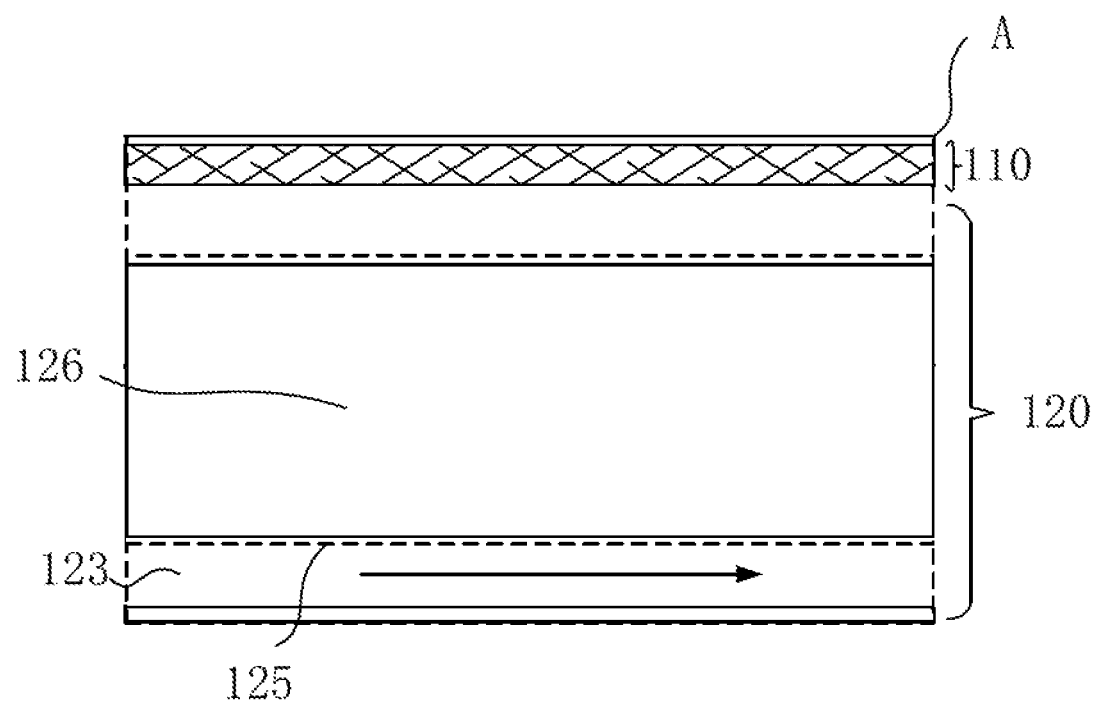
FIG. 4 is a top view of a part A according to an embodiment of this application.

As shown in FIG. 3, in an embodiment, there is only one groove 126. The groove 126 is a through groove extending along a frame of a non-display area 120. All Au balls 124 are arranged in the groove 126.

In this solution, an extending direction is indicated by an arrow shown in the figure. The groove 126 is a big through groove that can accommodate all the Au balls 124, so that a risk of overflowing of the Au ball 124 is smaller, and the Au ball 124 can be blocked in all directions.

Figure 5:
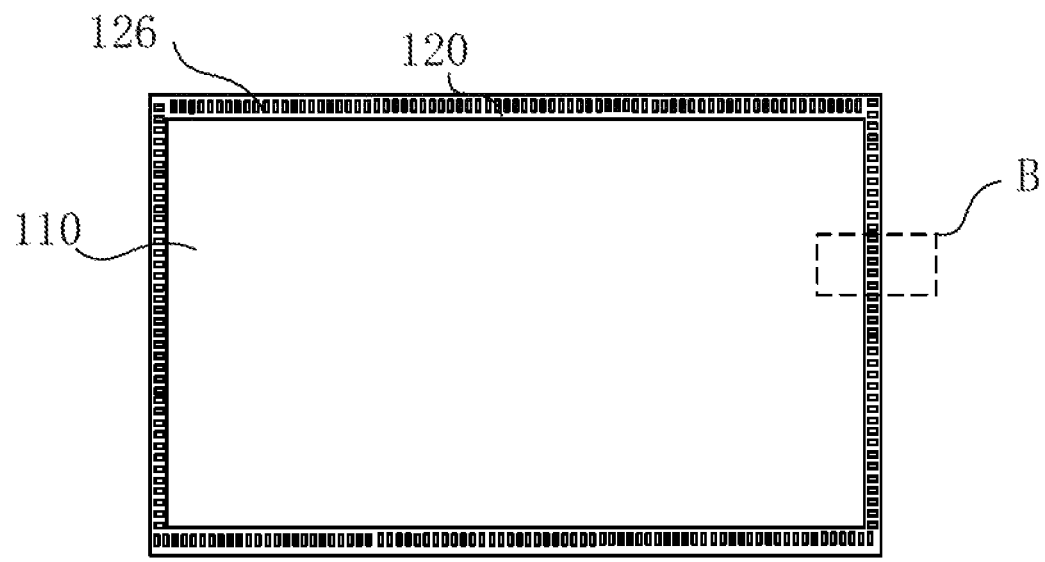
FIG. 5 is a top view of a plurality of grooves according to an embodiment of this application.
Figure 6:
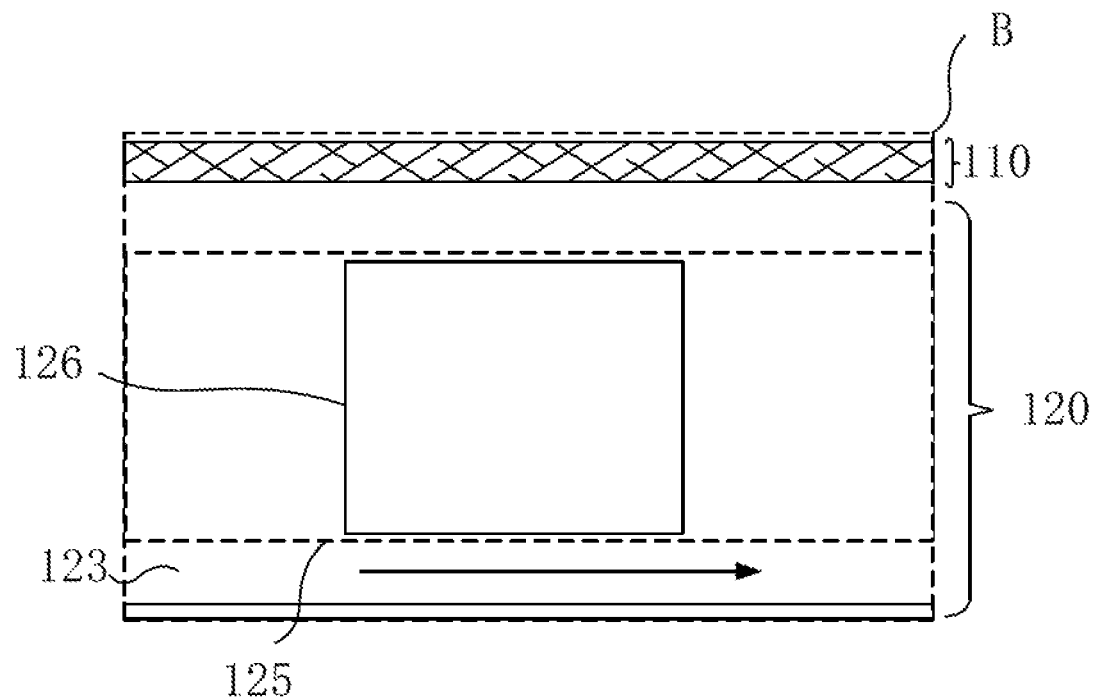
FIG. 6 is a top view of a part B according to an embodiment of this application.

As shown in FIG. 5 and FIG. 6, in an embodiment, there is a plurality of grooves 126 extending along a frame of a non-display area 120, and each Au ball 124 is correspondingly fixed in one of the grooves 126.

In this solution, an extending direction is indicated by an arrow shown in FIG. 6. One groove 126 corresponds to one Au ball 124, so that a range of displacement of each Au ball 124 is limited, and displacement of all the Au balls 124 is blocked. A protection effect is better based on the one-to-one fixing manner.

Figure 7:
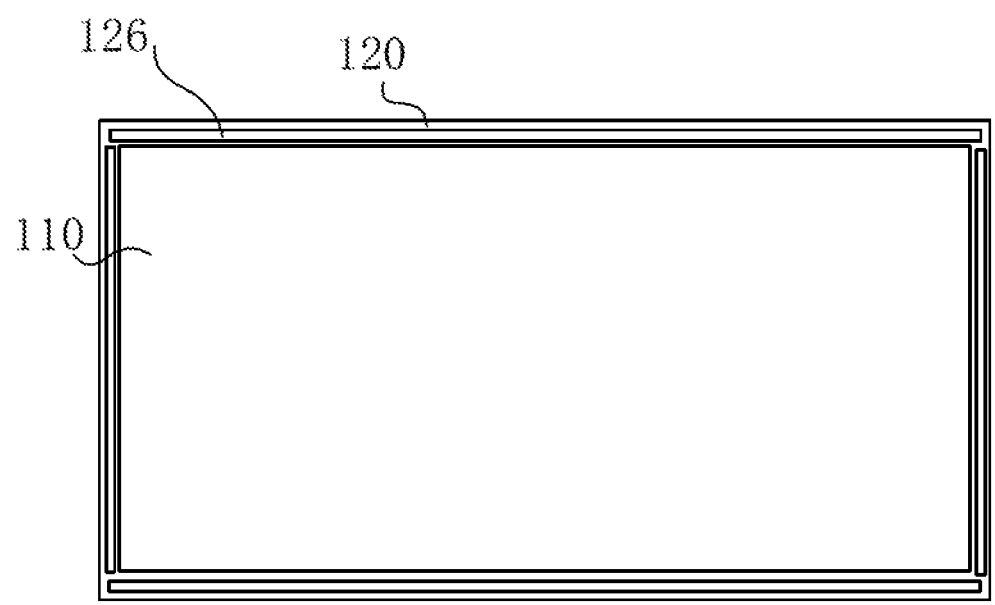
FIG. 7 is a top view of a groove according to an embodiment of this application.

As shown in FIG. 7, in an embodiment, there are four grooves 126, and lengths of the four grooves 126 are equal to lengths of Au ball fixing areas 125.

In this solution, the four grooves 126 are formed through the overall four Au ball fixing areas 125 on edges, increasing sizes of the Au ball fixing areas 125, so that Au balls 124 are aggregated in the grooves 126, and a range of motion of the Au balls 124 is more substantially limited.

As shown in FIG. 2, in an embodiment, a bottom of the groove 126 is a concave curved surface.

In this solution, the groove 126 has a height difference, and has a blocking function, and the bottom is a concave curved surface, making Au ball 124 particles be more centered on the bottom, so that a protection effect is enhanced and the Au ball 124 particles are difficult to overflow from the groove 126.

In an embodiment, a ratio of a height of a surface of an Au ball fixing area 125 to a height of a surface of a boundary area 130 ranges from 30% to 70%.

In this solution, a depth of the concave area is 30% to 70% of a thickness of the boundary area 130. For example, a thickness of the boundary area 130 is 1 μm, a concave area is designed to range from 0.3 μm to 0.7 μm. A deeper depth indicates a stronger blocking force, a lager limited displacement range, and a smaller possibility of light leakage and display unevenness. After an even common electrode layer 129 is added, the ratio is still unchanged.

Figure 8:
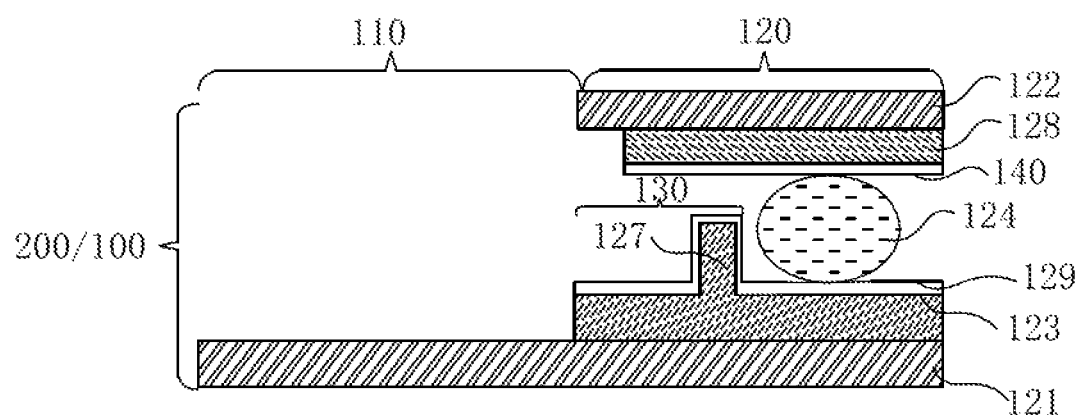
FIG. 8 is a sectional view of a retaining wall according to an embodiment of this application.

As shown in FIG. 8, in an embodiment, a black photoresist layer 123 includes a retaining wall 127 correspondingly formed in a boundary area 130, a material of the retaining wall 127 is the same as a material of the black photoresist layer 123, and a surface of an Au ball fixing area 125 is lower than a surface of the retaining wall in the boundary area 130.

In this solution, the retaining wall 127 is bulge-shaped, has a height difference, and can block the Au ball 124, to prevent the Au ball 124 from overflowing into a display area 110. A material of the retaining wall 127 is the same as that of the black photoresist layer 123. The retaining wall 127 and the black photoresist layer 123 are manufactured together, and the manufacturing process is simple.

Figure 9:
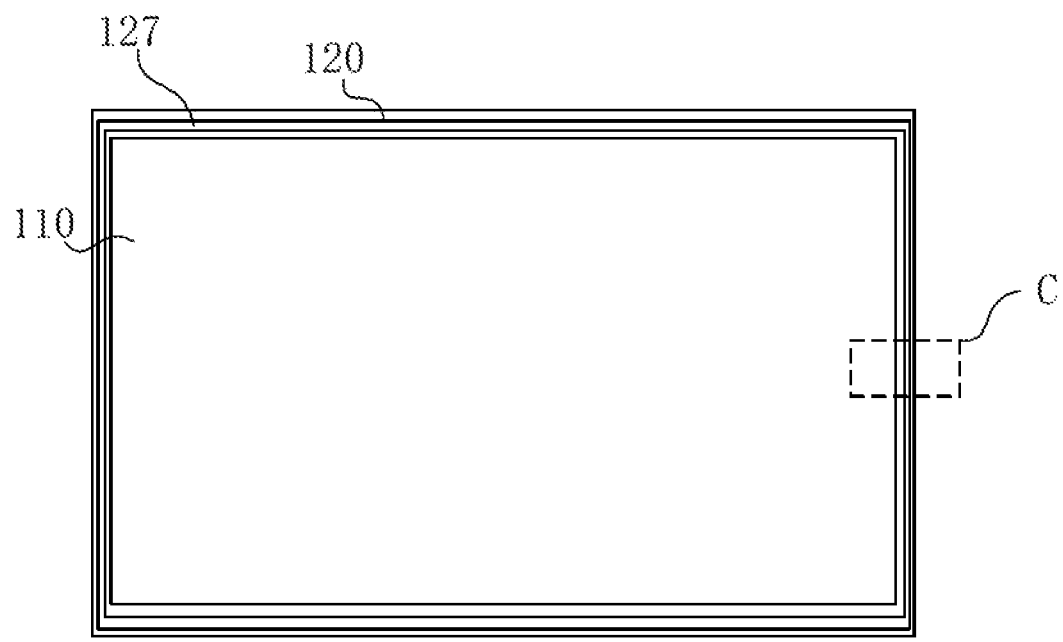
FIG. 9 is a sectional view of a retaining wall according to an embodiment of this application.
Figure 10:
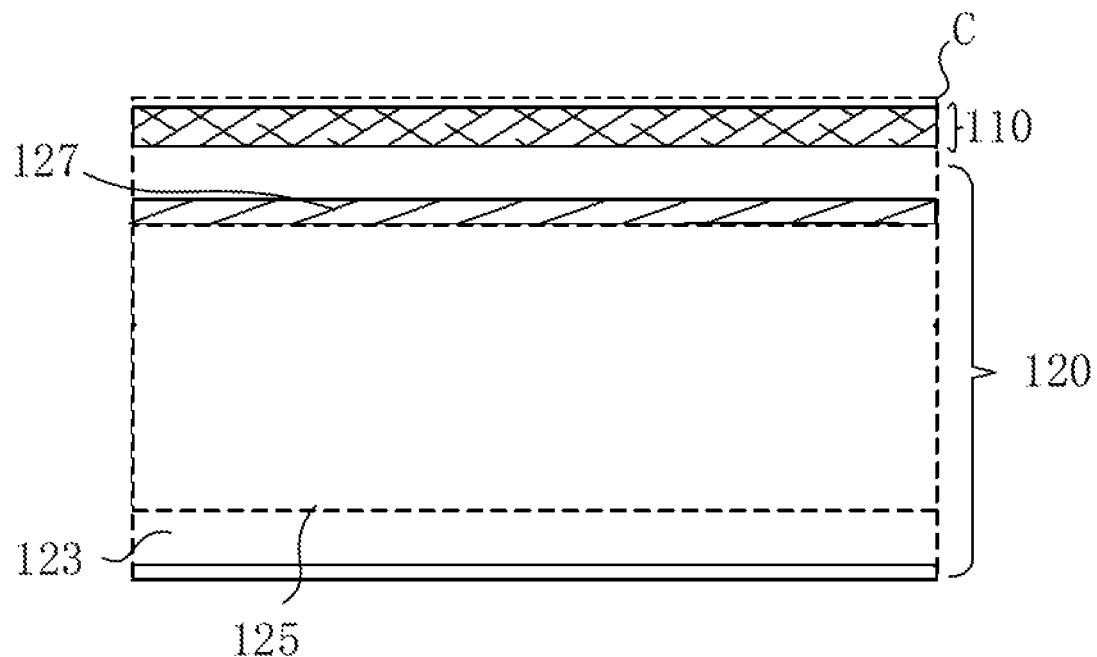
FIG. 10 is a top view of a part C according to an embodiment of this application.

In an embodiment, as shown in FIG. 9 and FIG. 10, in an embodiment, there are four retaining walls 127, and the four retaining walls 127 are connected end to end.

In this solution, lengths of the four retaining walls 127 exactly cover an entire Au ball 124 area. The lengths of the retaining walls 127 are equal to lengths of Au ball fixing areas 125. The retaining walls 127 are connected end to end without leaving a gap and correspond to the Au ball fixing areas 125 blocking overflow of the Au ball 124 on four edges, so that a blocked size is increased and a protection effect is enhanced.

In an embodiment, two ends of a retaining wall 127 exceed an Au ball fixing area 125.

A length of the retaining wall 127 is greater than a length of the Au ball fixing area 125, and exceeds a range of the Au ball fixing area 125. Since the Au ball 124 is a conductive particle and is active, when overflowing from a frame of the Au ball fixing area 125 and moving to a side of the retaining wall 127, the Au ball 124 is directly blocked back because of an increase of the length of the retaining wall 127, and if the retaining wall 127 is a little shorter, an Au ball 124 on the frame overflows, and further overflows into a display area 110, affecting display quality.

In another embodiment of this application, referring to FIG. 1 and FIG. 2, a display panel 100 is disclosed. The display panel 100 includes a first substrate 121 and a second substrate 122. The second substrate 122 is arranged opposite to the first substrate 121. A non-display area 120 of the first substrate 121 includes a black photoresist layer 123, a common electrode layer 129, Au balls 124, and at least one groove 126. The common electrode layer 129 is arranged on the black photoresist layer 123. The common electrode layer 129 includes an Au ball fixing area 125 at a position corresponding to the Au ball 124. A boundary area 130 is provided on one side of the Au ball fixing area 125 adjacent to a display area 110. The black photoresist layer 123 is provided with the groove 126 correspondingly formed in the Au ball fixing area 125. A surface of the common electrode layer 129 covering the Au ball fixing area 125 is lower than a surface of the common electrode layer 129 in the boundary area 130. A length of the groove 126 is equal to a length of the entire Au ball fixing area 125. The groove 126 is provided with a plurality of Au balls 124.

In this solution, the black photoresist layer 123 penetrates the display area 110 and the non-display area 120. The black photoresist layer 123 includes the Au ball fixing area 125 at a position corresponding to the Au ball 124. The Au ball fixing area 125 in the non-display area 120 is provided with the groove 126. The groove 126 and the black photoresist layer 123 are manufactured together without needing an extra process, and the manufacturing process is relatively simple. After the groove 126 is exposed, a length of the groove 126 corresponds to a length of the Au ball fixing area 125, so that a large quantity of Au balls 124 flow into the groove 126, and the Au balls 124 are more centered due to that the bottom of the groove 126 is a concave curved surface, further limiting a range of displacement of the Au balls 124, so that phenomena such as light leakage and display unevenness do not occur.

In another embodiment of this application, referring FIG. 1 to FIG. 10, a display device is disclosed. The display device includes any one of the foregoing display panels 100.

The panel of this application may be a twisted nematic (TN) panel, an in-plane switching (IPS) panel, or a multi-domain vertical alignment (VA) panel, and may certainly be any other suitable type of panel.

The foregoing contents are detailed descriptions of this application in conjunction with specific embodiments, and it should not be considered that the specific implementation of this application is limited to these descriptions. A person of ordinary skill in the art can further make simple deductions or replacements without departing from the concept of this application, and such deductions or replacements should all be considered as falling within the protection scope of this application.

What is claimed is:

1. A display panel, comprising:
   a first substrate; and
   a second substrate, arranged opposite to the first substrate, wherein
   a non-display area of the first substrate comprises:
   a black photoresist layer;
   a common electrode layer, arranged on the black photoresist layer and on a side of the black photoresist layer away from the first substrate; and
   at least one gold ball, arranged on the common electrode layer, and configured to connect the first substrate with the second substrate, wherein
   the common electrode layer comprises a gold ball fixing portion disposed at a position corresponding to the at least one gold ball, and a boundary portion disposed on a side of the gold ball fixing portion adjacent to a display area of the display panel; and
   a surface of the gold ball fixing portion is lower than a surface of the boundary portion.

2. The display panel according to claim 1, wherein the black photoresist layer defines at least one groove corresponding to the gold ball fixing portion; and a surface of the gold ball fixing portion of the common electrode layer covering the at least one groove is a first surface, and a surface of the boundary portion of the common electrode layer is a second surface, the first surface being lower than the second surface.

3. The display panel according to claim 2, wherein the at least one groove is a continuous groove extending along an entire frame of the non-display area; and there is arranged a plurality of gold balls, which are all arranged in the continuous groove.

4. The display panel according to claim 2, wherein the at least one groove comprises a plurality of grooves that extend along a frame of the non-display area and that are not in communication with each other; and there is provided a plurality of gold balls, wherein the plurality of grooves are in one-to-one correspondence with the plurality of gold balls, with each of the plurality of gold balls securely disposed in the one and only one corresponding groove.

5. The display panel according to claim 2, wherein there are provided four grooves that are respectively disposed along four sides of the non-display area and that are not in communication with each other, and wherein a length of each of the four grooves is equal to a length of the corresponding gold ball fixing portion disposed along a corresponding side of the non-display area.

6. The display panel according to claim 2, wherein a surface of the at least one groove is a concave curved surface.

7. The display panel according to claim 2, wherein a length of the at least one groove is greater than a length of the gold ball fixing portion.

8. The display panel according to claim 2, wherein the at least one groove has a smooth concave curved interior surface.

9. The display panel according to claim 2, wherein the at least one groove has an arc-shaped bottom wall and two vertical side walls respectively connected to two sides of the arc-shaped bottom wall.

10. The display panel according to claim 2, wherein the common electrode layer is disposed on the side of the black photoresist layer away from the first substrate and curves along with the black photoresist layer at the gold ball fixing portion to define a groove congruent and aligned with the at least one groove defined in the black photoresist layer.

11. The display panel according to claim 2, wherein the at least one groove defined in the black photoresist layer is a blind groove that does not go through the black photoresist layer, and a thickness of the black photoresist layer at a position corresponding to a lowest point of the at least one groove is greater than zero.

12. The display panel according to claim 1, wherein a ratio of a height of the surface of the gold ball fixing portion with respect to an inner surface of the second substrate to a height of the surface of the boundary portion with respect to an inner surface of the second substrate lies in the range of 30% to 70%.

13. The display panel according to claim 1, wherein the black photoresist layer comprises a retaining wall correspondingly formed in the boundary portion, the surface of the gold ball fixing portion being lower than a surface of the retaining wall in the boundary portion.

14. The display panel according to claim 13, wherein the retaining wall is made of a same material as the black photoresist layer.

15. The display panel according to claim 13, wherein a length of the retaining wall is greater than a length of the gold ball fixing portion.

16. The display panel according to claim 13, wherein there are provided four retaining walls that respectively disposed along four sides of the non-display area, and that are connected end to end.

17. The display panel according to claim 13, wherein the retaining wall has a rectangular cross section taken along a plane perpendicular to a length of the retaining wall, the length of the retaining wall running parallel to a corresponding side of the non-display area.

18. The display panel according to claim 1, wherein the first surface is an arc-shaped surface that is congruent with a surface of a lower portion of the gold ball contacting the first surface.

19. A display panel, comprising:
   a first substrate; and
   a second substrate, arranged opposite to the first substrate, wherein
   a non-display area of the first substrate comprises:
      a black photoresist layer; and
      a common electrode layer, arranged on the black photoresist layer and on a side of the black photoresist layer away from the first substrate; and
   at least one gold ball, arranged on the common electrode layer;
      wherein the common electrode layer comprises a gold ball fixing portion at a position corresponding to the at least one gold ball, and a boundary portion disposed on a side of the gold ball fixing portion adjacent to a display area of the display panel;
   wherein the black photoresist layer defines at least one groove corresponding to the gold ball fixing portion; and
   a surface of the gold ball fixing portion of the common electrode layer covering the at least one groove is lower than a surface of the boundary portion of the common electrode layer, and a length of the at least one groove is equal to a length of the entire gold ball fixing portion; and a plurality of gold balls are disposed in the at least one groove.

20. A display device, comprising a display panel, wherein the display panel comprises:
   a first substrate; and
   a second substrate, arranged opposite to the first substrate, wherein
   a non-display area of the first substrate comprises:
      a black photoresist layer;
      a common electrode layer, arranged on the black photoresist layer and on a side of the black photoresist layer away from the first substrate; and
      ballast least one gold ball, arranged on the common electrode layer, and configured to connect the first substrate with the second substrate, wherein
   the common electrode layer comprises a gold ball fixing portion at a position corresponding to the at least one gold ball, and a boundary portion disposed on a side of the gold ball fixing portion adjacent to a display area of the display panel; and
   a surface of the gold ball fixing portion is lower than a surface of the boundary portion.

\* \* \* \* \*